(12) United States Patent
Sasnett et al.

(10) Patent No.: US 7,882,203 B2
(45) Date of Patent: Feb. 1, 2011

(54) REMOTE AUTHORING FOR DYNAMIC WEB PAGES

(75) Inventors: Russell Mayo Sasnett, Kirkland, WA (US); Charles Yvon Bissonnette, Snoqualmie, WA (US); Simon Calvert, Issaquah, WA (US); Joseph Michael Davis, Issaquah, WA (US); Bulusu Krishna Mohan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 11/221,645

(22) Filed: Sep. 8, 2005

(65) Prior Publication Data

US 2007/0055755 A1 Mar. 8, 2007

(51) Int. Cl.
G06F 15/16 (2006.01)
G06F 9/44 (2006.01)
(52) U.S. Cl. .................................. 709/219; 717/167
(58) Field of Classification Search ......... 709/217–219, 709/227–229; 717/100–173
See application file for complete search history.

(56) References Cited

U.S. PATENT DOCUMENTS

| 6,026,433 | A | 2/2000 | D'Arlach et al. ............ 709/217 |
| 6,779,153 | B1 | 8/2004 | Kagle ........................... 715/522 |
| 2002/0095435 | A1 | 7/2002 | Graham ........................ 707/201 |
| 2003/0163519 | A1 | 8/2003 | Kegel et al. ................. 709/203 |
| 2003/0204810 | A1 | 10/2003 | Dam et al. ................... 715/500 |
| 2004/0059945 | A1* | 3/2004 | Henson et al. .............. 713/201 |
| 2004/0148576 | A1 | 7/2004 | Matveyenko et al. ........ 715/530 |

FOREIGN PATENT DOCUMENTS

| GB | 2397915 A | 4/2004 |
| WO | WO 2004/006132 A1 | 1/2004 |
| WO | WO 2005/033827 A2 | 4/2005 |

OTHER PUBLICATIONS

Jason I. Hong et al.; "WebQuilt: A Proxy-based Approach to Remote Web Usability Testing"; 2001; pp. 263-285; ACM Transactions on Information Systems, vol. 19, No. 3.
Miller et al.; "Creating Dynamic World Wide QWeb Pages By Demonstration"; 1 page; http://md1.csa.com/partners/viewrecord.php?requester=gs&collection=TDR&recid=N9726977AH&q=remote+web+pages+editor&uid=1000214&setcookie=yes.
"Remote Scripting with IFRAME"; pp. 1-8; http://developer.apple.com/internet/webcontent/iframe.html.

* cited by examiner

Primary Examiner—Joseph E Avellino
Assistant Examiner—Afshawn Towfighi
(74) Attorney, Agent, or Firm—Merchant & Gould P.C.

(57) ABSTRACT

A remote authoring service is described. Remote page authoring includes receiving a stream of data from a server that includes embedded control attribute data. The embedded control attribute data facilitates the generation of a proxy control and allows a web page designer to make modifications to dynamic elements of the webpage without requiring the executable code for the actual controls. The proxy control may provide preview data of the control to allow the client to perform authoring functions using the proxy control. Modifications made via the proxy control service may then be transmitted to the server where the controls are updated.

15 Claims, 11 Drawing Sheets

REMOTE AUTHORING FOR DYNAMIC WEB PAGES

BACKGROUND

Web pages are rendered during a "run-time", and during a "design-time", web pages may be authored. Web page authors may desire modifying or authoring web form controls during a design-time. Web form controls may include elements of a webpage that are rendered by executable code when a webpage is fetched by a browser during run-time. The executable code for the web form controls is typically installed on the web server for use during webpage rendering. Access to the web server is typically restricted for security reasons, and therefore, webpage authors may not have direct access to the executable code of the controls for authoring or modification. The executable code for the controls may also be installed on a "sandbox" computing device so that webpage authors have access to the executable code of the controls. However, the executable code for controls is typically licensed for installation on the web server. Also, the web server may provide a unique context that cannot be replicated on a "sandbox" computing device. Therefore, the use of a "sandbox" computing device is typically undesirable.

SUMMARY

This Summary is provided to introduce a selection of concepts in a simplified form that are further described below in the Detailed Description. This Summary is not intended to identify key features or essential features of the claimed subject matter. Also, this Summary is not intended for use as an aid in determining the scope of the claimed subject matter.

Generally, aspects of the disclosure relate to remote authoring of dynamic web pages. As a succinct summation of a few functional aspects of some aspects of the present disclosure, a web page designer may author controls remotely from a client computer by using a remote authoring service. The remote authoring service obtains a data stream from a server. The obtained data stream may include embedded control attributes that represent preview and property data of the control without requiring the executable code of the control. In one aspect, the embedded attributes facilitate the generation of a proxy control on the client and allows a web page designer to make modifications to customizable aspects of the controls of the web page without the executable code for the controls. The proxy control may provide a preview of the actual control to allow the client to perform authoring functions using the proxy control. To the client, the proxy controls may look and provide some functionality as if the webpage designer was authoring directly on the server. Modifications made via the remote authoring service may then be sent to the server where the executable code for the controls resides. The executable code may then be used to update the actual controls.

Remote page authoring provides dynamic authoring functionality for a client computer without requiring installation of the actual controls on the client. In this manner, remote page authoring may circumvent licensing issues where the actual controls are licensed to be installed on the server. Remote authoring also circumvents the requirement for the author to author the webpage on the server. In other aspects, remote authoring supports authoring where a client does not have access to development framework or server context.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Embodiments of Remote Authoring for Dynamic Web Pages.

Succinctly stated, embodiments of the disclosure relate to remote authoring of dynamic web pages. As a succinct summation of a few functional aspects of some embodiments of the present disclosure, a web page designer may author web form controls remotely from a client computer by using a proxy control. The remote authoring service receives a data stream from a server. The received data stream may include embedded control attributes that represent preview and property data of the control without requiring the executable code of the control. The embedded attributes facilitate the generation of a proxy control on the client and allow a web page designer to make modifications to customizable aspects of the controls of the webpage without the executable code for the controls. The proxy control may provide at least a preview of the actual control to allow the client to perform authoring functions using the proxy control. To the client, the proxy controls may look and provide some functionality as if the webpage designer was authoring directly on the server. Modifications made via the remote authoring service may then be sent to the server where the actual executable code for the controls resides. The executable code may then be used to update the actual controls.

Figure 3:
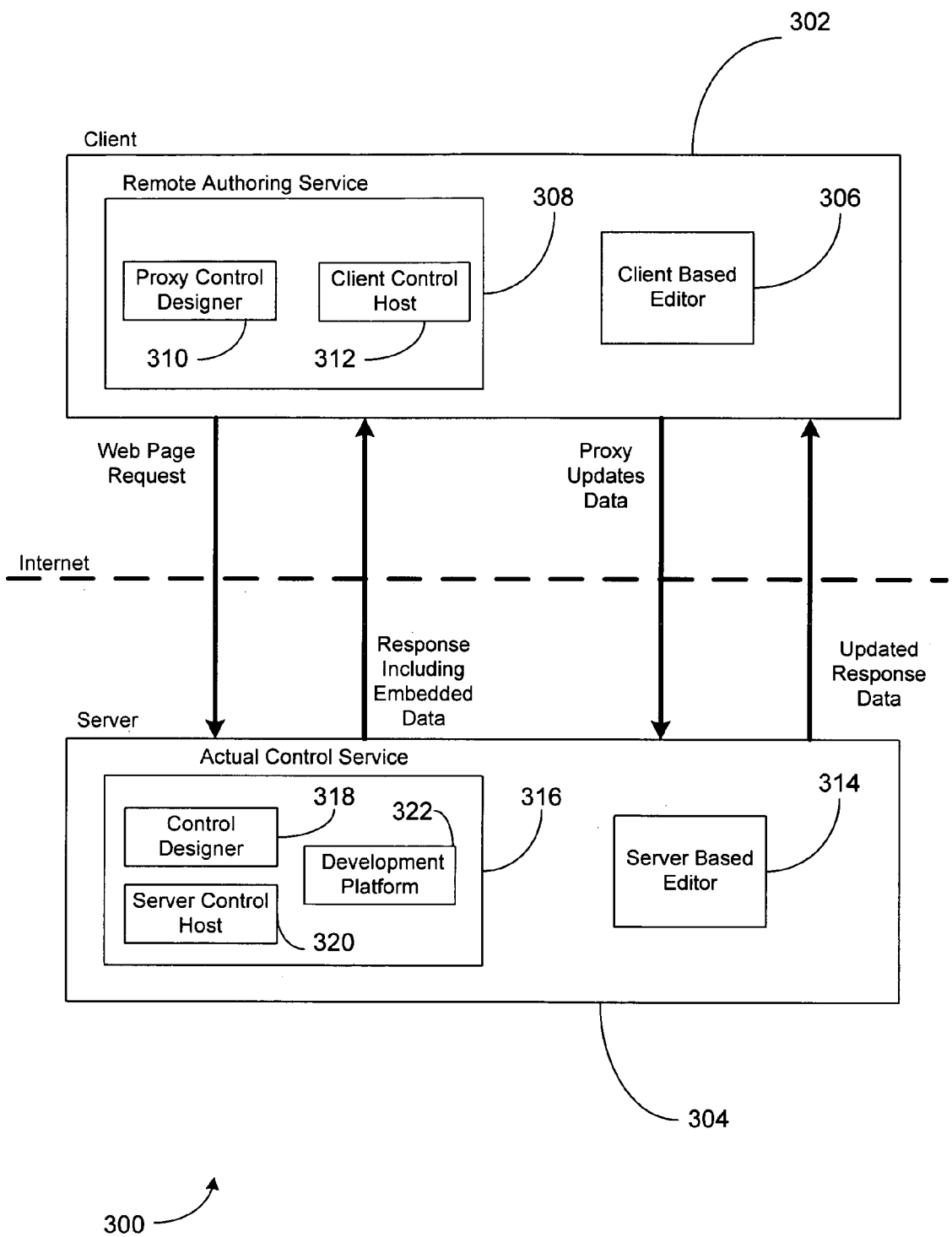
FIG. 3 represents one exemplary system overview for remote authoring of dynamic web pages.

FIG. 3 represents one exemplary system overview 300 for remote authoring of dynamic web pages. Client 302 and server 304 represent a general modular overview of some aspects of the disclosure. Client 302 and server 304 may include the same modular elements being represented during different processes. Client 302 and server 304 may be integrated as a combination of software and hardware elements, an operating system or any combination thereof. Hardware, databases, software or applications referenced herein may be integrated as a single element or include various elements in communication with one another.

Software and/or hardware elements are depicted herein for explanatory purposes only and not for limiting the configuration to multiple elements or a single element performing several functions. Elements of client 302 may "live on" a single computing device or a plurality of computing devices in communication with one another. Likewise, elements of server 304 may "live on" a single server or a plurality of servers in communication with one another. Aspects of client 302 and server 304 may include computing device 100 as exemplified in FIG. 1 and/or mobile computing device 200 as exemplified in FIG. 2. In one aspect, server 304 may be represented by aspects of MICROSOFT SHAREPOINT from MICROSOFT CORPORATION, headquartered in Redmond, Wash.

In FIG. 3, client 302 may include client based editor 306, remote authoring service 308, proxy control designer 310 and client control host 312. Reference numbers 306-312 may include separate programs, separate databases, separate computing devices and separate hardware. Reference numbers 306-312 may also include multiple programs, databases, computing devices, hardware or any combination thereof. Server 304 may include server based editor 314, actual control service 316, control designer 318, server control host 320, and development platform 322. Reference numbers 314-322 may include separate programs, separate databases, separate computing devices and separate hardware. Reference numbers 314-322 may also include multiple programs, databases, computing devices, hardware or any combination thereof. Moreover, even though eXtensible Markup Language ("XML") is referenced herein, any type of data stream conducive to network communication may be implemented. XML is referenced herein as one example of the plurality of various network communication languages that may be implemented. Any type of data stream and/or markup may be implemented as is more fully set forth herein.

In FIG. 3, client based editor 306 and server based editor 314 may include a webpage editor for authoring, modifying or designing web pages and controls for web pages. In one embodiment, client based editor 306 and server based editor 314 may be represented by aspects of MICROSOFT FRONTPAGE from MICROSOFT CORPORATION, headquartered in Redmond, Wash. Client based editor 306 and server based editor 314 may include aspects of any page editor for authoring, modifying and/or designing web pages.

As is more fully set forth below, server based editor 314 is associated with actual control service 316. Actual control service 316 may include the executable code of the controls associated therewith. Actual control service 316 may include development platform 322. Development platform 322 may include a set of web development tools for building dynamic websites, web applications and markup language web services. Aspects may include a platform that provides web development tools to allow programmers to write code using a plurality of different program languages. In one embodiment, development platform 322 may be represented by aspects of MICROSOFT ASP.NET platform from MICROSOFT CORPORATION, headquartered in Redmond, Wash. Development platform 322 may include any type of development platform for writing code for pages associated with a network.

Actual control service 316 may also include server control host 320. In general, server control host 320 may include a surface container for hosting one or more control designers, such as control designer 318. Server control host 320 may also facilitate embedding control preview and control property data into a data stream for transmission to client 302. In one embodiment, server control host 320 may be represented by aspects of MICROSOFT Microsoft.Web.Design ("MWD") from MICROSOFT CORPORATION, headquartered in Redmond, Wash. Actual control service 316 may further include control designer 318. Control designer 318 may include the executable code for the controls that are associated with a webpage.

As is more fully set forth below, client based editor 306 is associated with remote authoring service 308. Remote authoring service 308 may include client control host 312. Even though client control host 312 is depicted as an element of remote authoring service 308, client control host 312 may include a separate element apart from remote authoring service 308. In general, client control host 312 may include a surface container for hosting controls that are installed on the client and one or more proxy control designers, such as proxy control designer 310. Client control host 312 may generate proxy controls from embedded control property and control preview data that is associated with a data stream. Client control host 312 may also generate data streams of original page data and modification data for updating on server 304. In one embodiment, client control host 312 may be represented by aspects of MICROSOFT MWD from MICROSOFT CORPORATION, headquartered in Redmond, Wash. Proxy control service 308 may further include proxy control designer 310. Proxy control designer 310 includes modification data for proxy controls to facilitate the transmission of modification data to server 304.

In general and as is more fully set forth below, client 302 sends a webpage request to server 304. In response, server 304 sends a response that includes embedded preview and control property data to client 302. The response includes a data stream of the webpage and includes embedded control preview and control property data of controls associated with the webpage. In one aspect, the preview data is attribute encoded HTML and the property data is attribute encoded XML. In this manner, the structure of the response is not changed via the embedding. In one embodiment, the markup of the controls is transmitted and not the executable code.

However, it is contemplated that the embedded response data may include portions of the executable code to facilitate various functionality on client 302. Client 302 processes the embedded data to generate proxy controls on client 302. The proxy controls are implemented in the webpage that the user opens on the client during design-time. When a user makes modifications to the proxy controls, the modifications may be batched on client 302. When an update trigger is instantiated, client 302 transmits the proxy update data to server 304. Such update triggers may include an explicit user input or an implicit trigger. Server 304 processes the proxy update data to update the actual controls. Server 304 may transmit updated response data to client 302 for further processing.

Figure 4:
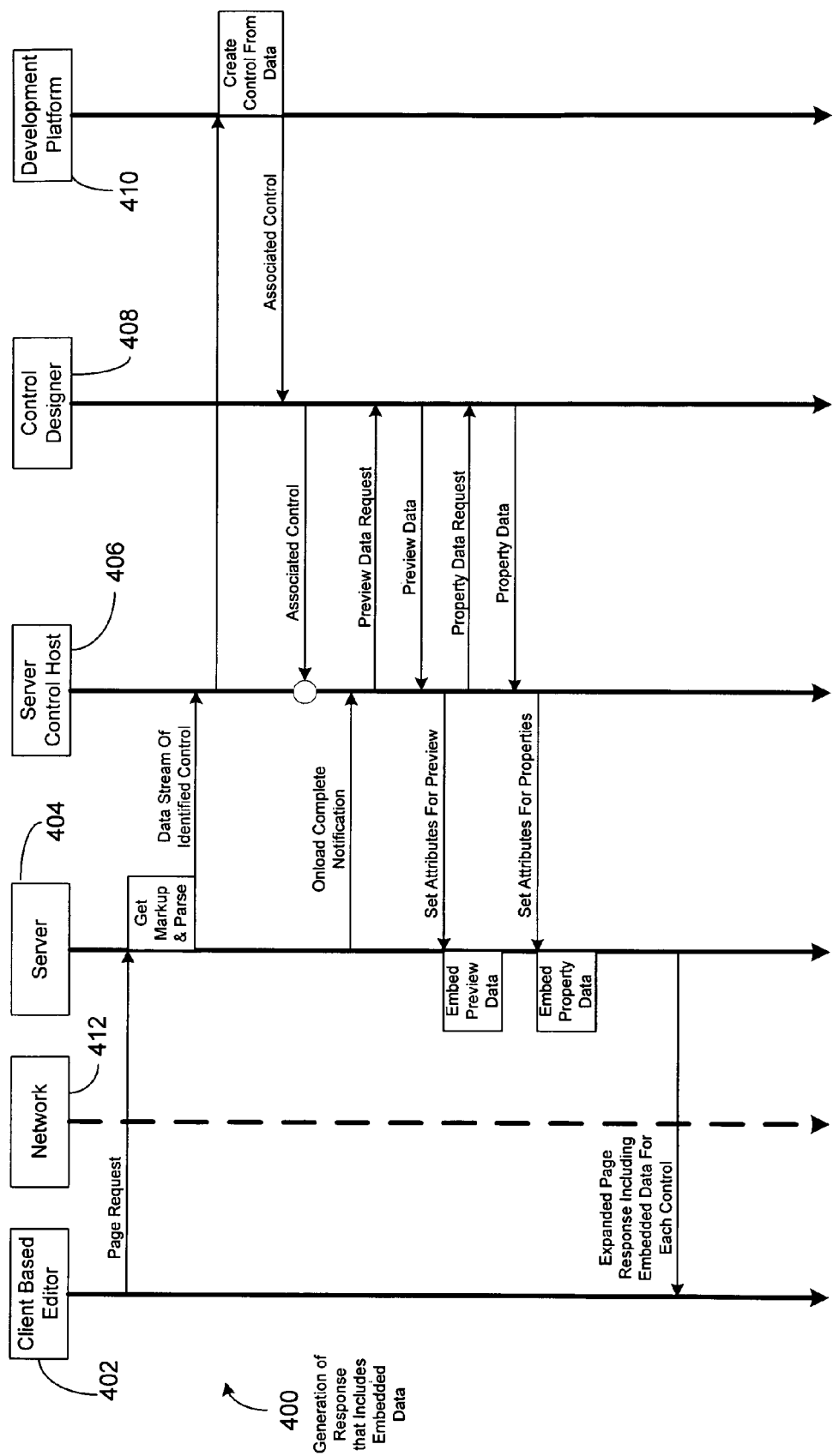
FIG. 4 represents one exemplary time-dependent flow diagram for the generation of a response that includes embedded data.

FIG. 4 represents one exemplary time-dependent flow diagram of aspects of a process 400 for generating a response that includes embedded data. Aspects of client based editor 402, server 404, server control host 406, control designer 408, and development platform 410 are described above in conjunction with FIG. 3. Network 412 may include an intranet, the Internet or any other type of network conducive for sending and receiving data. The arrows extending from reference numbers 402-412 represent the passage of time.

In general, a web page designer sends a page request from client based editor 402. The page request may include a service call when the web page designer decides to open a web page for editing. The page request is sent through network 412 to server 404. In one aspect, server 404 retrieves the markup for the requested page. Server 404 parses the markup of the requested page to identify the markup of controls that are associated with the page. In one aspect, server 404 parses the markup of the requested page to identify markup of ASP-.NET controls. The markup of the identified controls is sent to server control host 406 and server control host 406 passes the markup for the controls to development platform 410. Development platform 410 parses the markup for the controls to create a web control for the markup. Development platform 410 associates the created web control with control designer 408. The controls are then passed to server control host 406.

When the markup for the controls in the page is associated with one or more controls, server 404 sends an on-load complete notification to server control host 406. Server control host 406 queries data from the controls. Server control host 406 sends a preview data request to control designer 408. Control designer 408 identifies preview data associated with the control and transmits the preview data to server control host 406. A set attributes call is sent to server 404, where server 404 embeds design-time preview attributes into a data stream. In one aspect, the data stream is an XML document that includes the data for the requested page along with the embedded preview attributes. Server control host 406 may also send a property data request to control designer 408. Control designer 408 identifies property data associated with the control and transmits the property data to server control host 406. A set attributes call is sent to server 404, where server 404 embeds design-time property attributes into a data stream. In one aspect, when the preview and property attributes are embedded into the data stream, server 404 transmits an expanded page response to client based editor 402. In one aspect, the expanded page response may include an XML data stream that includes the embedded data for the controls associated with the page.

Figure 5:
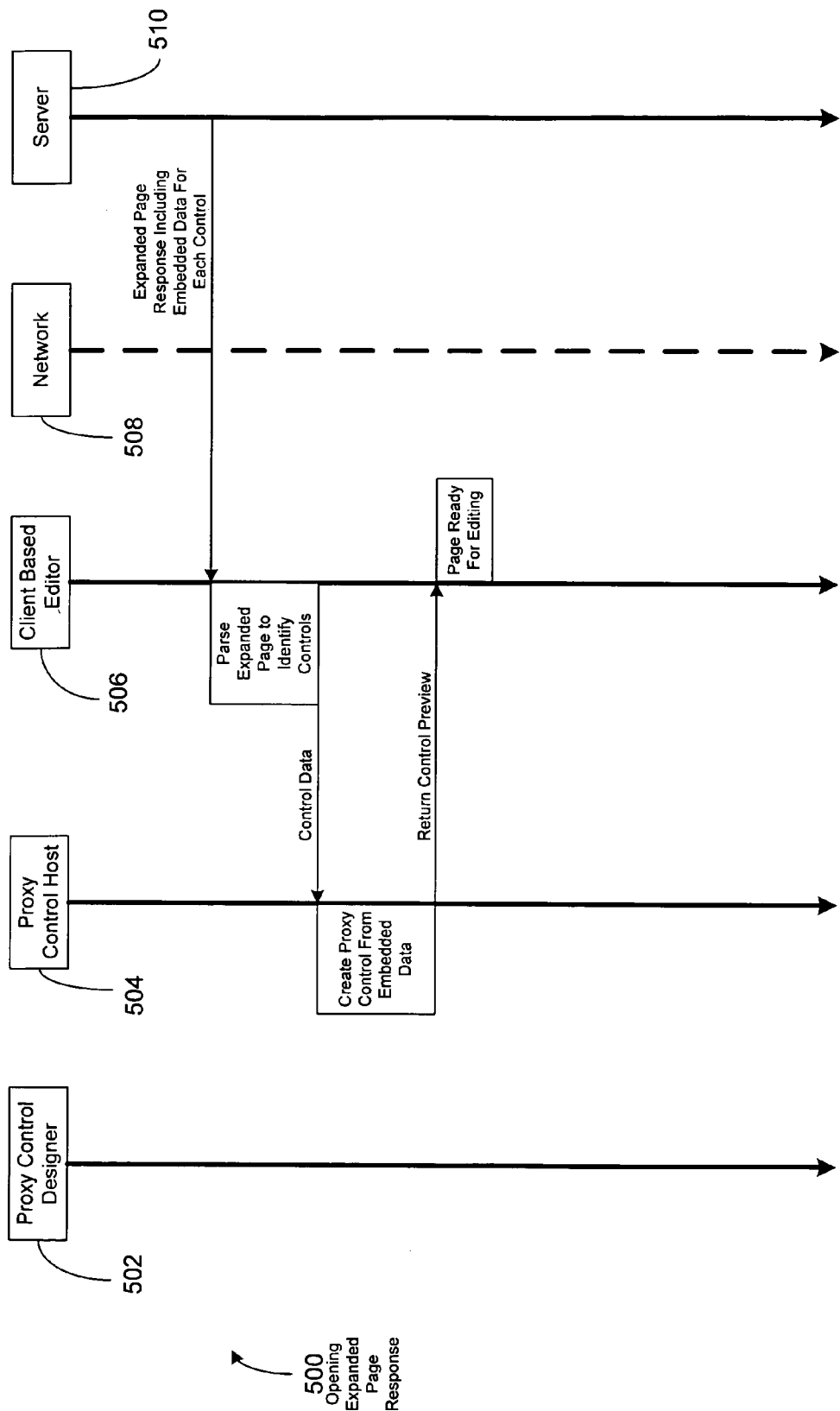
FIG. 5 represents one exemplary time-dependent flow diagram for opening an expanded page response.

FIG. 5 represents one exemplary time-dependent flow diagram of aspects of a process 500 for opening the expanded page response. Proxy control designer 502, proxy control host 504, client based editor 506, network 508 and server 510 are described hereinabove. The arrows extending from reference numbers 502-510 represent the passage of time.

Server 510 sends the expanded page response through network 508 to client based editor 506. Client based editor 506 parses the expanded page response to identify the controls associated with the expanded page response. In one aspect, client based editor 506 utilizes the preview attributes associated with the expanded page response during parsing. The markup data of the controls is sent to proxy control host 504 where proxy controls are generated from the embedded data. Proxy control host 504 may extract the preview attributes and property attributes associated with the control and generate a proxy control from this data. In one aspect, the proxy control is an unencoded proxy control. Aspects may also include populating values associated with the control during the generation of the proxy. The control preview is sent to client based editor 506, where the page is ready for editing by a web page designer. Succinctly stated, at this point in process 500, the page is opened and ready for editing.

Figure 6:
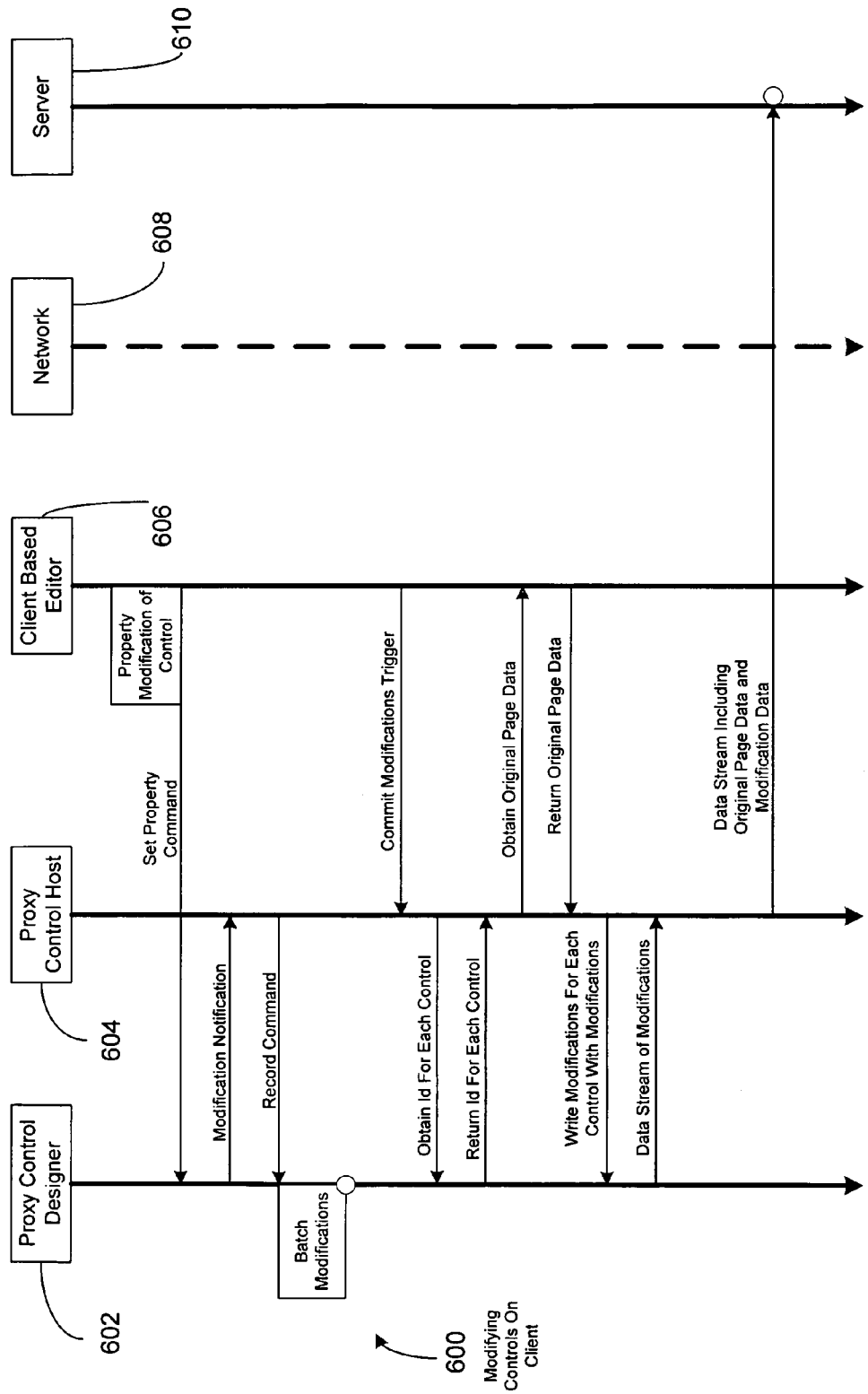
FIG. 6 represents one exemplary time-dependent flow diagram for modifying controls on a client.

FIG. 6 represents one exemplary time-dependent flow diagram of aspects of a process 600 for modifying controls on the client. Proxy control designer 602, proxy control host 604, client based editor 606, network 608 and server 610 are described hereinabove. The arrows extending from reference numbers 602-610 represent the passage of time.

During an editing process, a web page designer may make a modification to one or more of the proxy controls associated with the page. In one aspect, such a modification is instantiated on client based editor 606. For example, a web page designer may make a property change to one of the proxy controls. A set property command is sent to proxy control designer 602, where the property is set. Proxy control designer 602 sends a modification notification to proxy control host 604, and proxy control host 604 sends a record modification command to proxy control designer 602. Proxy control designer 602 stores the modification, and batches any further modifications until a trigger is instantiated. Such triggers may include an explicit user input or an implicit trigger. By batching the modifications, proxy control designer 602 may send a set of modifications in one transaction. In such a situation, network traffic is reduced between the client and the server.

A commit modifications trigger may be instantiated, where client based editor 606 communicates to proxy control host 604 to commit the modifications batched by proxy control designer 602. For the controls associated with the web page, proxy control host 604 requests an identification from proxy control designer 602. Proxy control designer 602 sends the identifications of the controls to proxy control host 604. Proxy control host 604 also requests the original markup of the page from client based editor 606, and client based editor 606 transmits the original markup to proxy control host 604. As the identifications for the controls and the original markup are transmitted to proxy control host 604, a stream is generated. In one aspect, the stream is an XML stream.

For the controls that include modifications, proxy control host 604 requests that proxy control designer 602 send a stream indicating the modifications made to the controls. In one aspect the stream includes an XML stream. At this point in process 600, proxy control host 604 has received data that includes the original page stream and a stream of the modifications made to the controls. In one aspect, proxy control host 604 assembles the data into an XML document for transmission to server 610. Proxy control host 604 transmits the data stream to server 610.

Figure 7:
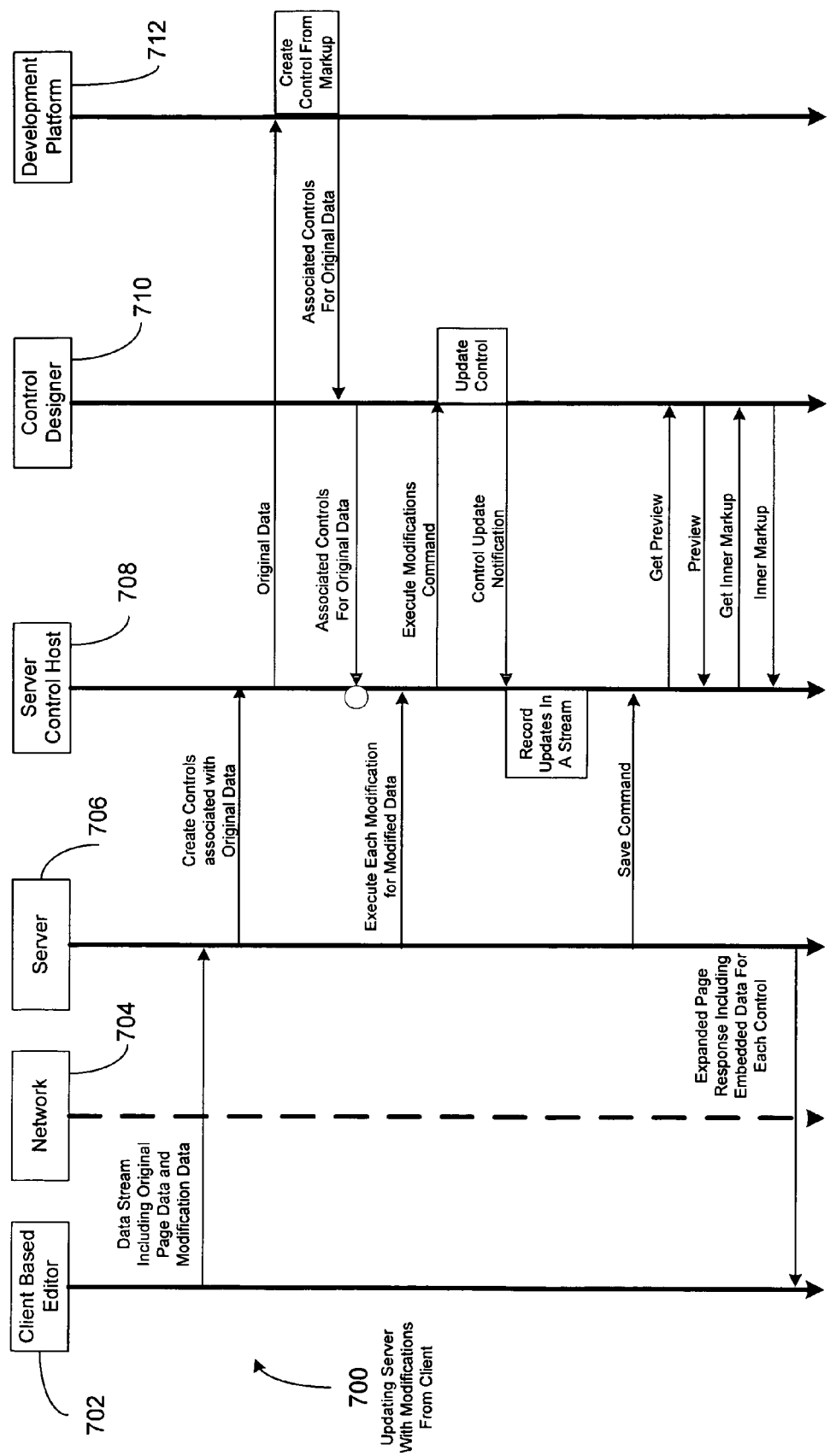
FIG. 7 represents one exemplary time-dependent flow diagram for updating a server with modifications from a client.

FIG. 7 represents one exemplary time-dependent flow diagram of aspects of a process 700 for updating the server with modifications from the client. Client based editor 702, network 704, server 706, server control host 708, control designer 710 and development platform 712 are described hereinabove. The arrows extending from reference numbers 702-712 represent the passage of time.

Server 706 receives the original page stream and a stream of the modifications made to the controls from the client. Server 706 passes the original data to server control host 708. In one aspect, in that the controls are identified in the original data, the original data does not require parsing. Server control host 708 passes the original data to development platform 712. Development platform 712 creates a control for the controls identified in the original data and associates a control designer with the created controls. Control designer 710 notifies server control host 708 of the associated controls for the original data.

When the original data has been processed, the modifications associated with the modified data is executed. Server 706 requests that server control host 708 execute the modifications for the modified data. Server control host 708 requests that control designer 710 execute the modifications to update the controls. Control designer 710 updates the controls. Control designer 710 sends a control update notification to server control host 708 and server control host 708 records the updates in a data stream. In one aspect the data stream is an XML data stream.

When the modifications have been executed, server 706 calls an on-save command, which triggers server control host 708 to request preview data from control designer 710. Control designer 710 transmits preview data to server control host 708 for the controls. Server control host 708 also requests inner markup from control designer 710 and control designer 710 transmits the inner markup to server control host 708 for the controls. Server 706 sends an expanded page response back to client based editor 702. In one aspect, the expanded page response includes the preview data, the inner markup data, and update notifications associated with the modifications. Client based editor 702 may then continue processing as stated above with respect to FIGS. 6-7.

Figure 8:
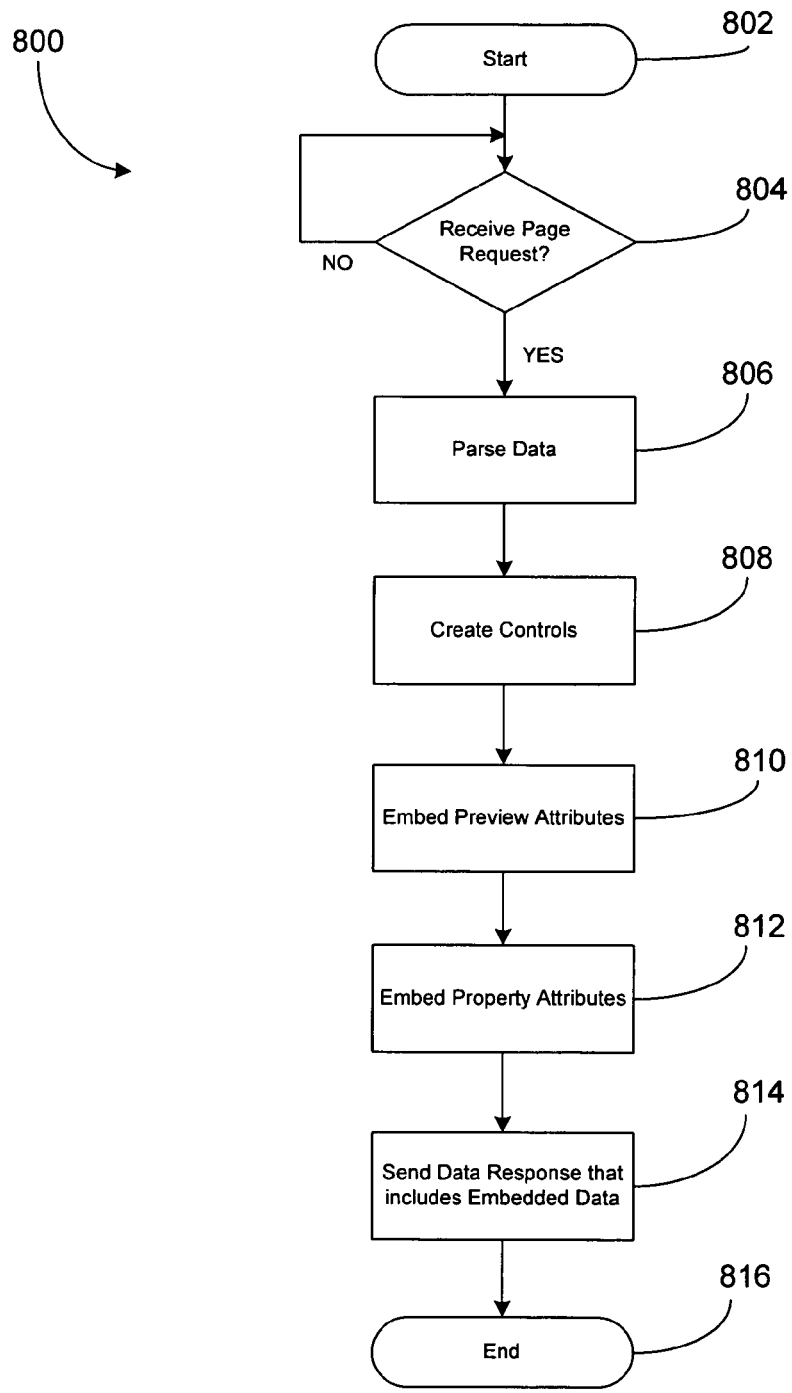
FIG. 8 is an operational flow diagram representing an exemplary embodiment for generating a response that includes embedded data.

FIG. 8 is an operational flow diagram representing an exemplary embodiment for generating a response that includes embedded data. Operational flow 800 starts at start operation 802 and flows to receive operation 804, where it is determined whether a page request has been received. In one aspect, receive operation 804 includes a webpage request from a remote client computer. Receive operation 804 loops back when a page request is not received. When receive operation 804 receives a page request, operational flow 800 continues to parse operation 806. In one aspect, parse operation 806 includes getting the data for the requested page and parsing the data to identify data associated with the controls of the requested webpage. Operational flow 800 continues to create controls operation 808, where controls associated with the parsed data are created. In one aspect, controls are generated from the parsed data and associated with a control designer.

Operational flow 800 continues to embed preview attributes operation 810. In one aspect, preview attribute data is retrieved and embedded into an XML data stream. Similarly, embed property attributes operation 812 may include retrieving property attribute data and embedding the property attribute data into an XML data stream. At send operation 814, a data stream is generated to include the embedded preview and property attributes. The generated data stream may be transmitted to a client. Operational flow 800 ends at end operation 816.

Figure 9:
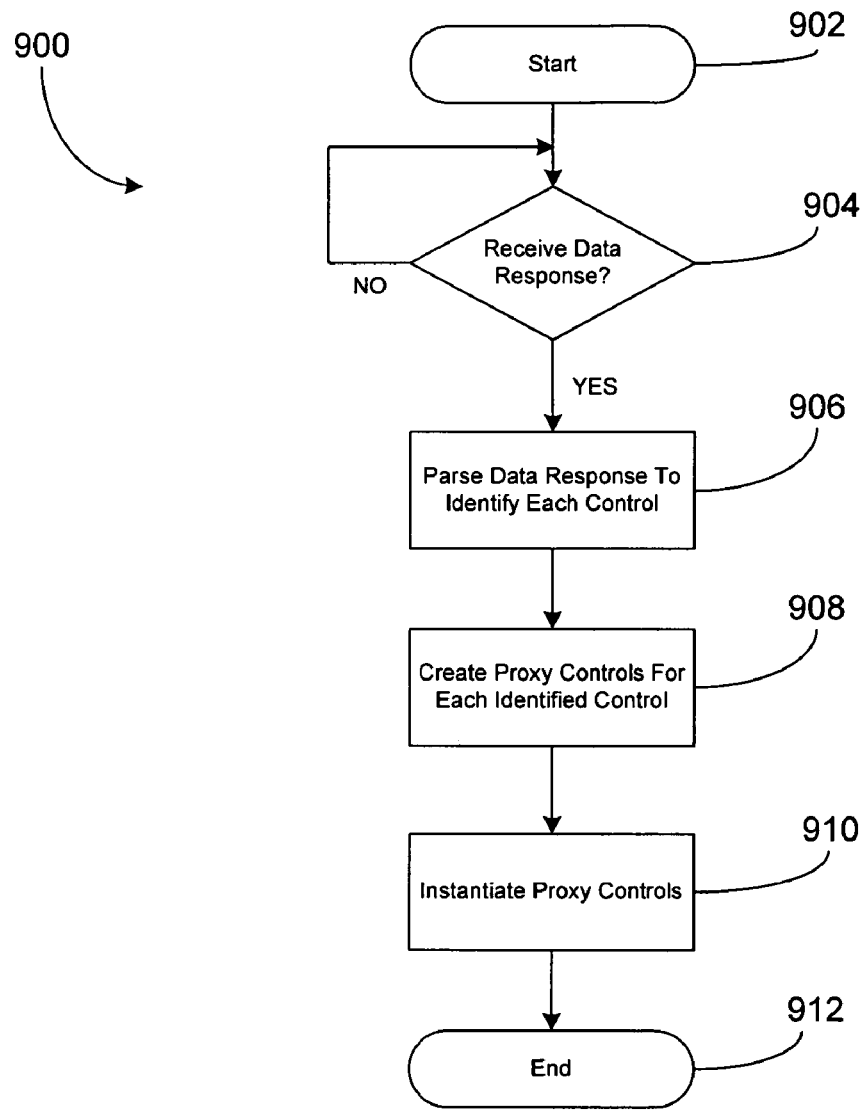
FIG. 9 is an operational flow diagram representing an exemplary embodiment for opening a response that includes embedded data.

FIG. 9 is a flow diagram representing an exemplary embodiment for opening a data response that includes embedded data. Operational flow 900 starts at start operation 902 and flows to receive operation 904, where it is determined whether a response has been received. Receive operation 904 loops back when a response is not received. When receive operation 904 receives a response, operational flow 900 continues to parse operation 906. In one aspect, the response includes an XML data stream that includes control preview attributes and control property attributes embedded therein. During parse operation 906, controls associated with the embedded data response are identified.

Operational flow 900 continues to create proxy operation 908, where a proxy control is generated for the identified controls. In one aspect, the embedded preview attributes and the embedded property attributes facilitate the generation of a proxy control. In another aspect, the proxy control is generated without the executable code associated with the server. The user experience on the client may be similar to a user experience on the server without requiring the executable code for the controls on the client.

Instantiate proxy control operation 910 includes opening the webpage with the proxy controls for the identified controls that are associated with the data stream. Operational flow 900 continues to end operation 912 where the process ends.

Figure 10:
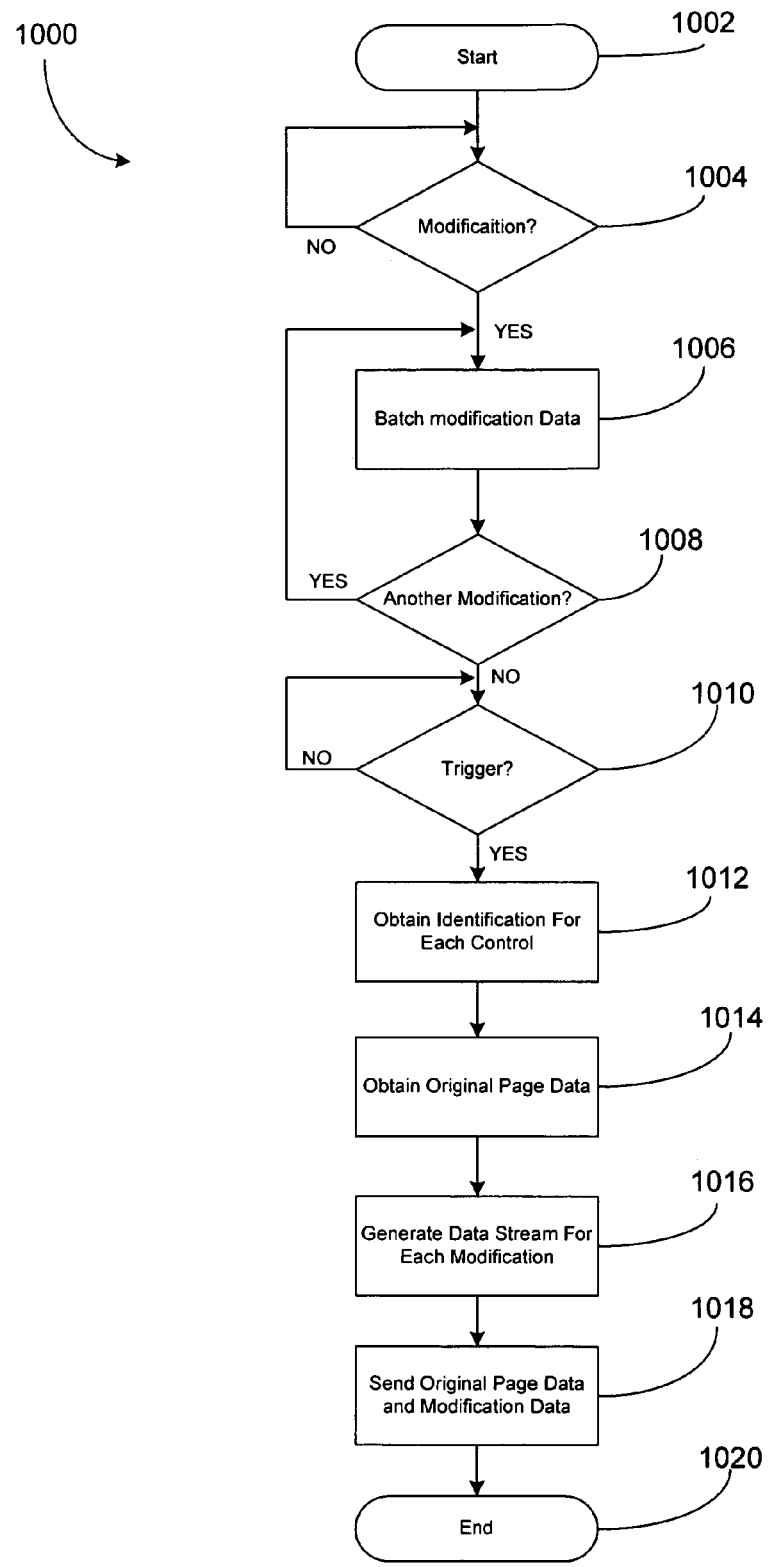
FIG. 10 is an operational flow diagram representing an exemplary embodiment for modifying controls.

FIG. 10 is a flow diagram representing an exemplary embodiment for modifying controls. Operational flow 1000 starts at start operation 1002 and flows to modification operation 1004, where it is determined whether a modification is made to a webpage. Modification operation 1004 loops back when a modification operation is not received. When modification operation 1004 receives a modification, operational flow 1000 continues to batch operation 1006. In one aspect, modifications to the webpage are stored and/or batched until a time when a trigger operation is instantiated. Batch operation 1006 continues to another modification operation 1008, where it is determined whether another modification has been made to the webpage. Operational flow 1000 loops back to batch operation 1006 when another modification is made. Operational flow 1000 continues to trigger operation 1010 when another modification is not made. At trigger operation 1010, it is determined whether a trigger has been entered. A trigger may include a user input, a preset time trigger, and/or clicking away from the webpage. Trigger operation 1010 loops back when a trigger is not entered. When a trigger is entered, operational flow 1000 continues to get identification operation 1012.

In one embodiment, obtain identification operation 1012 includes retrieving the identification for the controls associated with the original data stream. Operational flow 1000 continues to obtain original data operation 1014, where the original data is retrieved. At modification data stream operation 1016, the modification data batched during batch operation 1006 facilitates the generation of a data stream that includes the modification data. Operational flow 1000 continues to send operation 1018. In one aspect, send operation 1018 includes generating an XML document that includes the original page markup along with markup that indicates modifications made to controls associated with the original page. Operational flow 1000 ends at end operation 1020.

Figure 11:
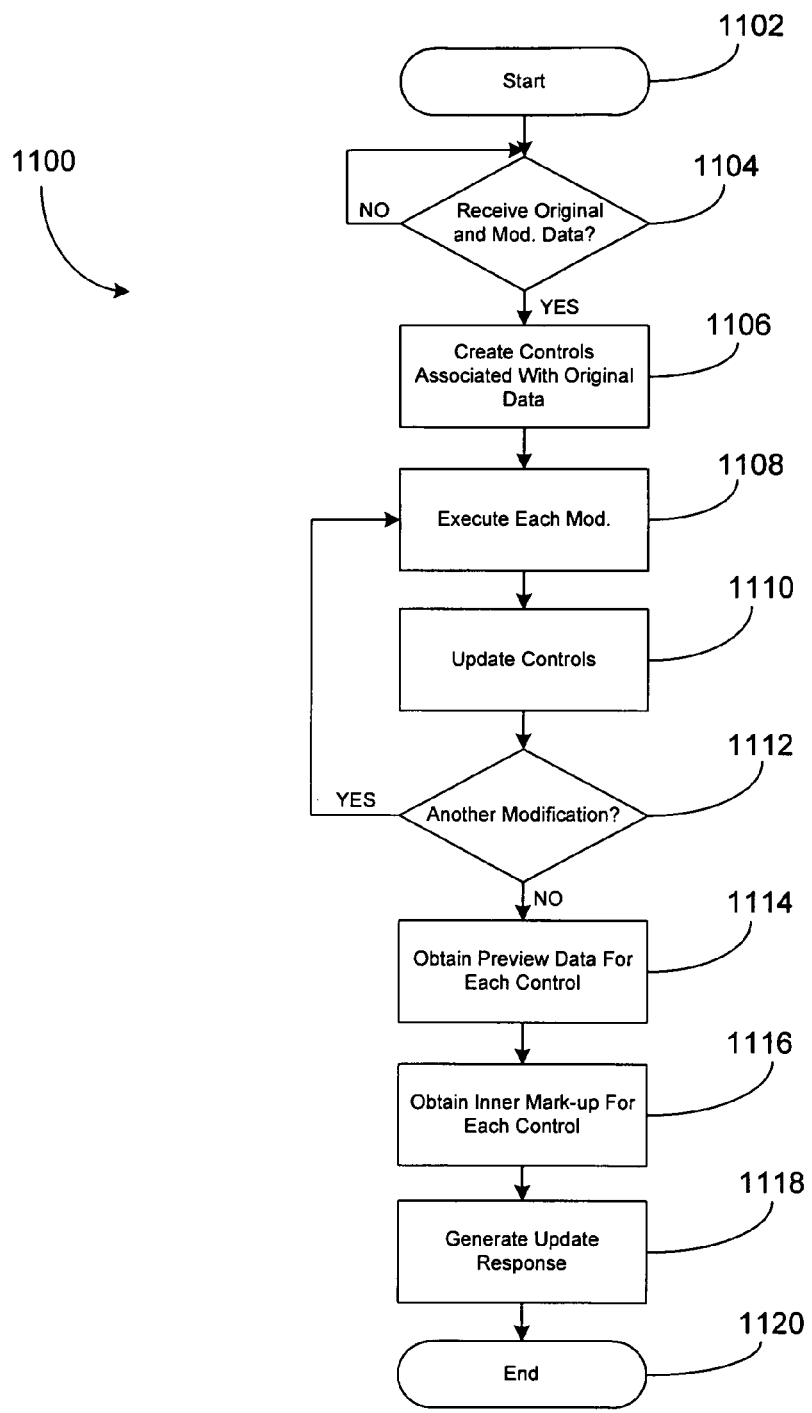
FIG. 11 is an operational flow diagram representing an exemplary embodiment for updating controls.

FIG. 11 is a flow diagram representing an exemplary embodiment for updating controls. Operational flow 1100 starts at start operation 1102 and flows to receive operation 1104, where it is determined whether the data stream that includes the original data and the modification data is received. Receive operation 1104 loops back when the data stream is not received. When receive operation 1104 receives the data stream, operational flow 1100 continues to create operation 1106. In one aspect, create operation 1106 includes creating controls that are associated with the original document data in the data stream.

When the controls are created, operational flow 1100 continues to execute operation 1108, where any modifications associated with the control are executed. In one aspect, data associated with the received data stream facilitates the execution of the modifications. At update operation 1110, the controls are updated with the modification data. Operational flow 1100 continues to another modification operation 1112, where it is determined whether another modification is made. When another modification is made, operational flow 1100 loops back to execute operation 1108. When another modification is not made, operational flow 1100 continues to obtain preview operation 1114.

Obtain preview operation 1114 includes retrieving preview data associated with the controls that are modified. In a similar manner, obtain inner markup operation 1116 includes retrieving the inner markup for the controls that are modified. Operational flow 1100 continues to generate operation 1118, where a data stream is generated that includes preview data for the modified controls and inner markup data for the modified controls. In one aspect, the response is generated as an XML data stream for transmission over a network. Operational flow 1100 ends at end operation 1120.

As is set forth herein, aspects of remote authoring allow a page designer to remotely author dynamic elements of a page. Remote authoring also provides dynamic authoring functionality for a client computer without requiring the actual controls to "live" on the client. In this manner, remote page authoring may circumvent licensing issues where the actual controls are licensed to "live" on the server. Remote authoring also circumvents the enormous communication of data between the client and the server that would be required if the actual controls "lived" on the client. Remote authoring may further circumvent the requirement for the author to author the webpage on the server.

Illustrative Operating Environment

Figure 1:
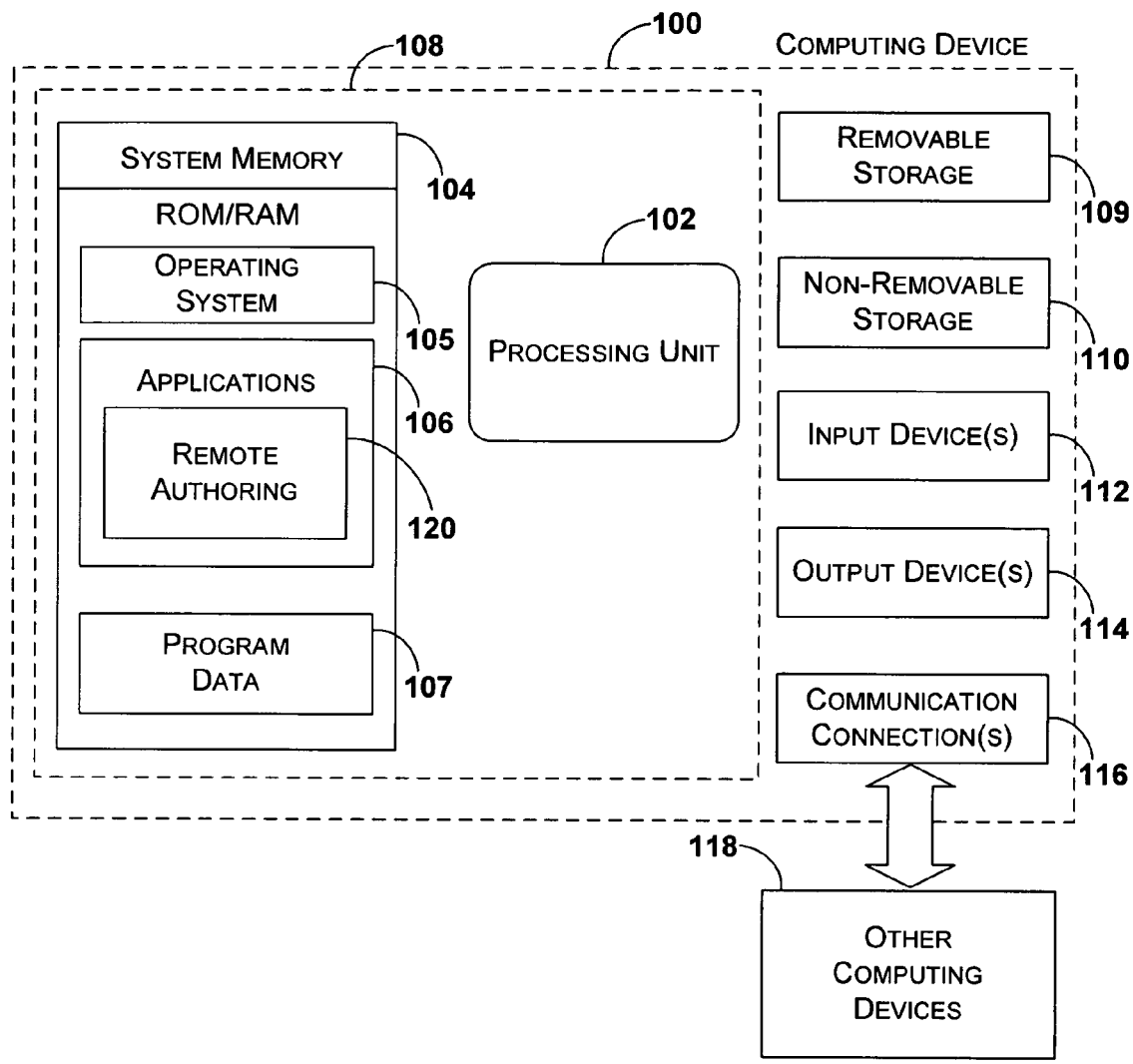
FIG. 1 illustrates an exemplary computing device that may be used in one aspect of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for remote authoring. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
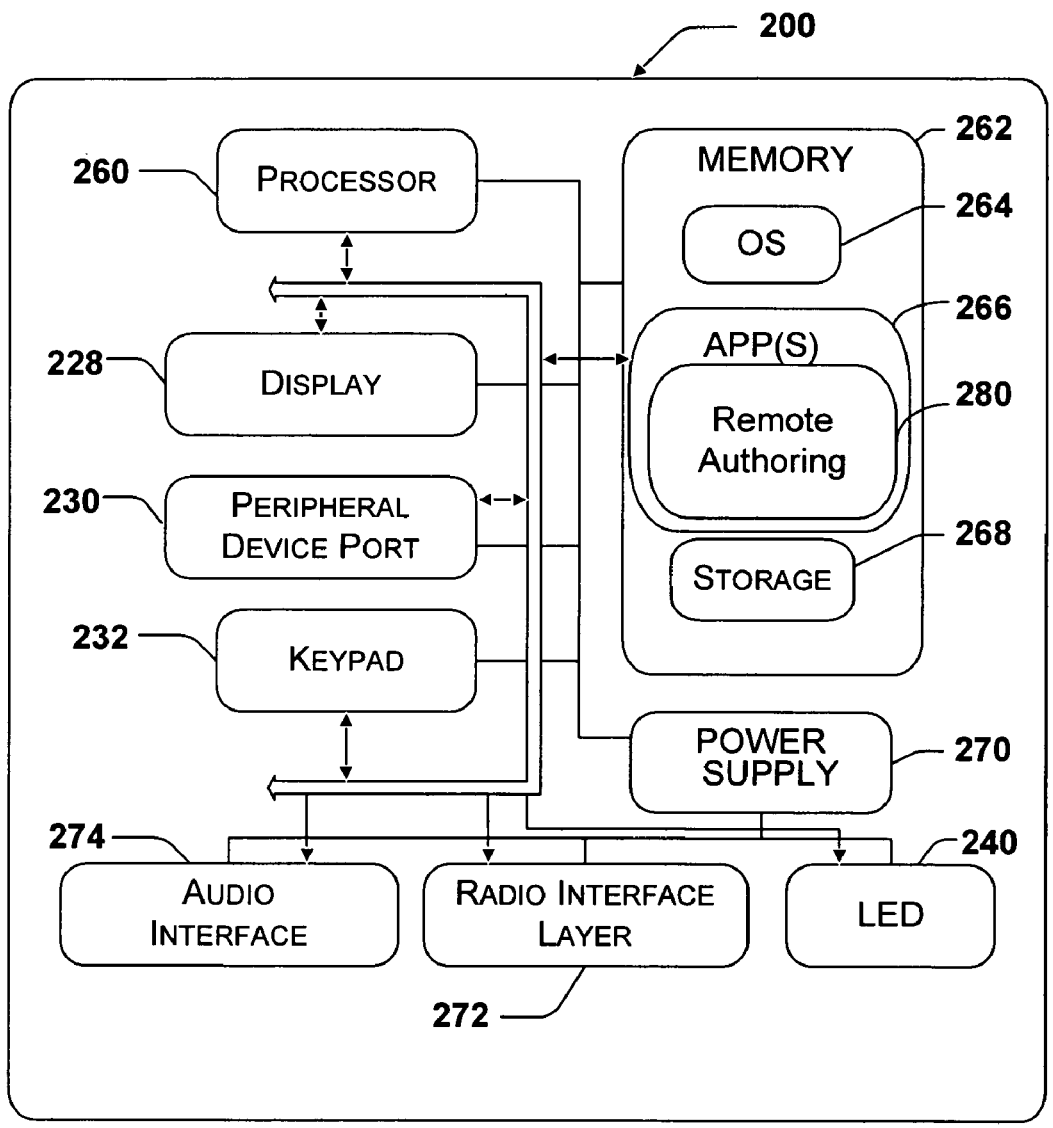
FIG. 2 illustrates an exemplary mobile device that may be used in one aspect of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for remote authoring.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for remotely authoring dynamic elements of a page associated with a network, the computer-implemented method comprising:
  receiving by at least one client computing system a data stream, wherein the data stream comprises an extensible markup language (XML) document that includes embedded data associated with attributes of at least one control of the page associated with the network, wherein the at least one control comprises executable code configured to render an element of the page and the data stream does not include the executable code;
  generating by the at least one client computing system at least one proxy control that represents the at least one control of the page, wherein the at least one proxy control is associated with the embedded attributes of the received data stream, and wherein the at least one proxy control provides at least some functionality of the at least one control of the page on the at least one client computing system;
  instantiating at the at least one client computing system the at least one proxy control, wherein the at least one proxy control enables remote editing of at least one dynamic element of the at least one control;
  receiving a modification to the at least one proxy control, wherein the modification is made to the embedded attributes associated with the at least one proxy control;
  storing by a proxy control designer running on the at least one client computing system the modification to the at least one proxy control;
  batching the modification in a batch with at least one other modification until a commit trigger is instantiated; and
  in response to the commit trigger, sending the batch of modifications.

2. The computer-implemented method of claim 1, wherein the XML document has markup of a requested page, embedded preview attributes for the at least one control, and embedded property attributes for the at least one control.

3. The computer-implemented method of claim 1, wherein generating at least one proxy control includes parsing the data stream and identifying the embedded attributes from the parsed data stream.

4. The computer-implemented method of claim 1, wherein the at least one proxy control does not include the executable code of the at least one control of the page.

5. The computer-implemented method of claim 1, wherein providing remote editing further comprises:
  determining when the commit trigger is instantiated;
  obtaining an identification for the at least one control;
  obtaining data associated with the received data stream;
  obtaining modification data from the proxy control designer associated with the batch of modifications; and
  generating a data stream that includes the data associated with the received data stream and the modification data.

6. The computer implemented method of claim 5, wherein the generated data stream that includes the data associated with the received data stream and the modification data is configured to update a control that lives on a server.

7. The computer-implemented method of claim 1, wherein providing remote editing further comprises:
  obtaining an identification associated with the at least one proxy;
  obtaining data associated with the received data stream;
  writing the proxy control modification to a modified data stream; and
  sending a response data stream, wherein the response data stream includes the data associated with the received data stream and the modified data stream.

8. The computer-implemented method of claim 7, wherein the response data stream includes a XML document and the XML document is configured for updating a server.

9. A computer storage media for storing computer executable instructions for generating a proxy control for remotely editing dynamic elements of controls associated with a webpage, the instructions comprising:
  obtaining by at least one client computing system an extensible markup language (XML) document, wherein the XML document includes embedded attributes for a first control and a second control of a requested webpage, the first control comprising first executable code configured to render an element of the page and the data stream does not include the first executable code, the second control comprising second executable code configured to render a second element of the page and the data stream does not include the second executable code;
  parsing by the at least one client computing system the received XML document to identify the embedded attributes for the first control and the second control;
  generating by the at least one client computing system a first proxy control associated with the embedded attributes of the first control and a second proxy control associated with the embedded attributes of the second control, wherein the first proxy control provides at least some functionality of the first control on the client computing system, and wherein the second proxy control provides at least some functionality of the second control on the client computing system;
  receiving a first modification to the first proxy control at the at least one client computing system, wherein the first modification is to the embedded attributes associated with the first proxy control;

receiving a second modification to the second proxy control at the at least one client computing system, wherein the second modification is to the embedded attributes associated with the second proxy control;

batching the first modification and the second modification by a proxy control designer running on the at least one client computing system to produce batched modification data associated with the first proxy control and the second proxy control; and generating by the at least one client computing system a response XML document, wherein the response XML document includes data associated with the received XML document and the batched modification data associated with the first proxy control and the second proxy control.

10. The computer storage medium of claim 9, wherein the embedded attributes include control preview data associated with the first control and the second control and control property data associated with the first control and the second control.

11. The computer storage medium of claim 10, wherein the control preview data and the control property data for the first control and the second control facilitate generating the first proxy control and the second proxy control.

12. A system for updating a control associated with a webpage through a remote authoring service, the system comprising:

at least one server computing device; and at least one client computing device;

wherein the at least one server computing device is configured to:

identify a first control and a second control associated with a webpage, wherein the first control and the second control comprises executable code configured to render one or more elements of the webpage;

associate first control attributes of the first control and second control attributes of the second control with an original data stream comprising an extensible markup language (XML) document; and send the original data stream to the at least one client computing device without sending the executable code; and wherein the at least one client computing device is configured to:

receive the original data stream from the at least one server;

identify the first control attributes of the first control and the second control attributes of the second control associated with the original data stream;

generate a first control proxy from the first control attributes of the first control and generate a second control proxy from the second control attributes of the second control to allow editing of the first control attributes and the second control attributes at the client, wherein the first proxy control provides at least some functionality of the first control on the client computing system, and wherein the second proxy control provides at least some functionality of the second control on the client computing system;

receive a first modification to the first control attributes of the first proxy control and a second modification to the second control attributes of the second proxy control; and batch by a proxy control designer running on the client computing device modification data associated with the first modification and the second modification.

13. The system of claim 12, wherein the original data stream includes preview attributes and property attributes.

14. The system of claim 12, wherein the at least one client computing device is further configured to:

generate an update data stream that includes data associated with the original data stream and the modification data; and send the update data stream to the server.

15. The system of claim 14, wherein the server is further configured to:

receive the update data stream;

identify the first and the second controls associated with the original data stream; and update the first and the second controls with the modification data.

* * * * *

UNITED STATES PATENT AND TRADEMARK OFFICE
CERTIFICATE OF CORRECTION

PATENT NO. : 7,882,203 B2
APPLICATION NO. : 11/221645
DATED : February 1, 2011
INVENTOR(S) : Russell Mayo Sasnett et al.

It is certified that error appears in the above-identified patent and that said Letters Patent is hereby corrected as shown below:

In column 11, line 66, in Claim 1, after "modification" delete "in a batch".

Signed and Sealed this
Nineteenth Day of July, 2011

David J. Kappos
*Director of the United States Patent and Trademark Office*